(12) United States Patent
Ische et al.

(10) Patent No.: US 8,730,100 B2
(45) Date of Patent: May 20, 2014

(54) ON DEMAND POSITIONING

(71) Applicant: QUALCOMM Incorporated, San Diego, CA (US)

(72) Inventors: Marc Anthony Ische, San Diego, CA (US); Ahmad Hatami, Pleasonton, CA (US); Ardalan Heshmati, Saratoga, CA (US); Zoltan F. Biacs, San Mateo, CA (US); Douglas N. Rowitch, Honolulu, HI (US); Dominic Farmer, Los Gatos, CA (US); Srigouri Kamarsu, Cupertino, CA (US); Jie Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/750,851

(22) Filed: Jan. 25, 2013

(65) Prior Publication Data
US 2013/0147663 A1    Jun. 13, 2013

Related U.S. Application Data

(62) Division of application No. 12/792,678, filed on Jun. 2, 2010, now Pat. No. 8,390,512.

(60) Provisional application No. 61/184,410, filed on Jun. 5, 2009.

(51) Int. Cl.
G01S 19/46    (2010.01)
G01S 19/42    (2010.01)
G01S 19/45    (2010.01)

(52) U.S. Cl.
USPC ............ 342/357.29; 342/357.25; 342/357.28

(58) Field of Classification Search
USPC ............ 342/357.23, 357.25, 357.28, 357.29; 701/469, 495
See application file for complete search history.

(56) References Cited

U.S. PATENT DOCUMENTS

| | | | |
|---|---|---|---|
| 5,874,914 A | 2/1999 | Krasner |
| 5,936,572 A | 8/1999 | Loomis et al. |
| 6,415,226 B1 | 7/2002 | Kozak |
| 6,505,048 B1 | 1/2003 | Moles et al. |

(Continued)

FOREIGN PATENT DOCUMENTS

| | | |
|---|---|---|
| EP | 1256813 | 11/2002 |
| EP | 1850606 | 10/2007 |

(Continued)

OTHER PUBLICATIONS

IEEE Second International Conference on Availability. Reliability and Security (ARES'O7) Implicit Authorization for Accessing Location Data in a Social Context, Georg Treu, Florian Fuchs, and Christiane Dargatz. Mobile and Distributed Systems Group, Institute for Informatics, Department of Statistics, Ludwig-Maximilian University, Munich Germany. c 2007.

(Continued)

*Primary Examiner* — Dao Phan
(74) *Attorney, Agent, or Firm* — Arnold J. Gum

(57) ABSTRACT

The subject matter disclosed herein relates to a method, an apparatus, and an article related to determining a location of a mobile device using more than one location determining technology, including, but not limited to, obtaining background position information based at least in part on said more than one location determining technology, and updating said background position information based at least in part on said more than one location determining technology.

40 Claims, 4 Drawing Sheets

(56) References Cited

U.S. PATENT DOCUMENTS

| | | |
|---|---|---|
| 6,819,267 B1 | 11/2004 | Edmark et al. |
| 7,013,391 B2 | 3/2006 | Herle et al. |
| 7,412,400 B1 | 8/2008 | Bhela et al. |
| 8,014,793 B2 | 9/2011 | Kansal et al. |
| 8,134,465 B2 | 3/2012 | Fujiwara et al. |
| 8,390,512 B2 | 3/2013 | Ische et al. |
| 2002/0004399 A1 | 1/2002 | McDonnell et al. |
| 2003/0023726 A1 | 1/2003 | Rice et al. |
| 2006/0217130 A1 | 9/2006 | Rowitch et al. |
| 2009/0278738 A1 | 11/2009 | Gopinath |
| 2010/0220005 A1 | 9/2010 | Kosolobov et al. |
| 2011/0264615 A1 | 10/2011 | Rajan et al. |
| 2011/0285591 A1 | 11/2011 | Wong |

FOREIGN PATENT DOCUMENTS

| | | |
|---|---|---|
| JP | H1183529 A | 3/1999 |
| JP | 2001215268 A | 8/2001 |
| JP | 2006177772 A | 7/2006 |
| TW | I299954 B | 8/2008 |
| TW | M348953 U | 1/2009 |
| WO | 0221478 | 3/2002 |
| WO | 2004036240 | 4/2004 |

OTHER PUBLICATIONS

International Search Report and Written Opinion-PCT/US2010/037499, International Search Authority-European Patent Office-Nov. 29, 2010.

Partial International Search Report—PCT/US2010/037499—International Search Authority, European Patent Office, Oct. 4, 2010.

Taiwan Search Report—TW099118415—TIPO—Jul. 24, 2013.

ON DEMAND POSITIONING

CLAIM OF PRIORITY UNDER 35 U.S.C. §119

This application is divisional of U.S. application Ser. No. 12/792,678, granted as U.S. Pat. No. 8,390,512, entitled "On Demand Positioning," filed Jun. 2, 2010, which claims the benefit of and priority to U.S. Provisional Application No. 61/184,410 entitled "On Demand Positioning", filed Jun. 5, 2009, each of which is assigned to the assignee hereof and expressly incorporated herein by reference.

BACKGROUND

1. Field

The subject matter disclosed herein relates to determining a location of a mobile device using more than one location-determining technology.

2. Information

A satellite positioning system (SPS), such as the Global Positioning System (GPS), typically comprises a system of space vehicles such as earth orbiting satellite vehicles (SV's) enabling mobile devices, such as cellular telephones, personal communication system (PCS) devices, and other mobile devices to determine their location on the earth, based at least in part on signals received from the SV's. Such mobile devices may be equipped with an SPS receiver and be capable of processing SV signals to determine location. However, as time elapses and/or a mobile device experiences a changing radio-frequency (RF) environment, an ability of such a mobile device to determine its position may vary. Such a varying ability may be particularly undesirable for ever-increasing location-based services whose performance may depend on efficient and seamless position determination.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
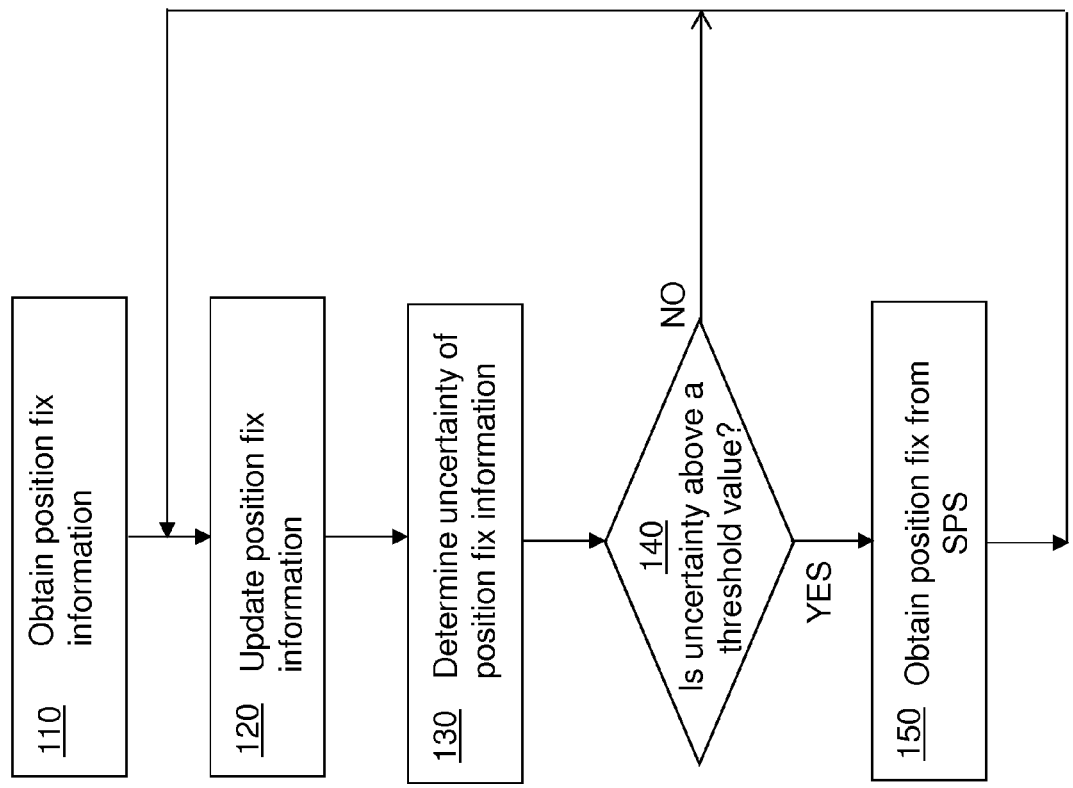
FIG. 1 is a flow diagram of a process for obtaining a position fix of a mobile device, according to an implementation.

In one particular implementation, a method may comprise obtaining position fix information from at least a satellite positioning system (SPS) signal, updating the position fix information based at least in part on a signal metric associated with one or more non-SPS sources, and obtaining a subsequent position fix from an SPS signal using the updated position fix information. It should be understood, however, that this is merely an example implementation and that claimed subject matter is not limited to this particular implementation.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

A satellite positioning system (SPS) may comprise a system of transmitters to transmit a signal marked with a repeating pseudo-random noise (PN) code of a set number of chips, ground-based control stations, user equipment and/or space vehicles. In a particular example, such transmitters may be located on Earth orbiting satellites. For example, a satellite in a constellation of a Global Navigation Satellite System (GNSS) such as Global Positioning System (GPS), Galileo, or Compass may transmit a signal marked with a PN code that is distinguishable from PN codes transmitted by other satellites in the constellation.

To estimate a position of a receiver, such as a mobile station (MS), a navigation system may determine pseudorange measurements to satellites "in view" of the receiver using well known techniques based, at least in part, on detections of PN codes in signals received from the satellites. An MS, for example, may comprise a cellular phone, a PDA, a GPS device, and so on. Such a pseudorange to a satellite may be determined based, at least in part, on a code phase detected in a received signal marked with a PN code associated with the satellite during a process of acquiring the received signal at a receiver. To acquire the received signal, such a receiver may correlate the received signal with a locally generated PN code associated with a satellite. For example, such a receiver may correlate such a received signal with multiple code and/or frequency shifted versions of such a locally generated PN code. Detection of a particular code shifted version yielding a correlation result with the highest signal power may indicate a code phase associated with the acquired signal for use in measuring pseudorange as discussed above. Of course, such a method of correlation is merely an example, and claimed subject matter is not so limited.

In an implementation, an on-demand positioning (ODP) engine, which may be located in an MS, may monitor a position of the MS by performing a quasi-periodic position determination. Herein, quasi-periodic refers to an event that occurs periodically with a frequency that may change from time to time, and/or to an event that occurs from time to time with no well-defined frequency. Such periodicity may depend at least in part on motion, velocity, and/or configuration of the MS, for example. Such an MS may be able to obtain position fix information from an SPS signal. The MS may also include motion-sensitive sensors to provide the MS with information regarding its position, orientation, and/or motion. Additionally, the MS may also include one or more wide/local/personal area wireless network interfaces (WNIs) that may be used to acquire one or more signal metrics corresponding to signals from one or more non-SPS location-determining technologies based on Wi-Fi, Bluetooth, RFID, UMTS, and/or CDMA, just to name a few examples. Such a signal metric may comprise a measurable quantity associated with one or more signals received at an WNI of the MS. Examples of signal metrics include, but are not limited to, identity of observed base stations and/or access points, received signal strength (RSS), round trip delay (RTD), time of arrival (TOA), time difference of arrival (TDOA) from observed base stations and/or access points, angle of arrival (AOA), and Doppler frequency. An MS may store position fix information obtained from an SPS signal while continuing to acquire one or more signal metrics obtained from one or more non-SPS sources. The MS may associate one or more signal metrics with a location of the MS. The MS may update stored position fix information based at least in part on one or more signal metrics associated with one or more non-SPS sources. Such position fix information may comprise any combination or subset of, for example, position/location (e.g., latitude, longitude, altitude); position uncertainty (e.g., error ellipse, Horizontal Estimated Position Error (HEPE)); velocity (e.g., speed, heading, vertical velocity); velocity uncertainty; time (e.g., absolute time stamp of position); time uncertainty; acceleration (e.g., in horizontal and vertical directions); an environment category (e.g., outdoor, indoor, urban, suburban); and other suitable components. Such position fix information may include uncertainties that change as time elapses due to local oscillator drift, and/or user motion, just to name a few examples. The MS may quasi-periodically and/or from time to time carry out an update of such stored position fix information, during which the MS may determine, based at least in part on one or more of the signal metrics, an uncertainty of the stored position fix information. Such an uncertainty may correspond to a measurement of reliability of the stored position fix information, and may be affected by age of the latest position fix information, motion of the MS, and/or the RF environment in which the MS operates, just to name a few examples. As the uncertainty of the position fix information increases, so too may the time needed to obtain subsequent position fix information from SPS signals. For example, if the uncertainty of stored position fix information is relatively low, then subsequent SPS-based position fix information may be acquired relatively quickly. On the other hand, if the uncertainty of stored position fix information is relatively high, then subsequent SPS-based position fix information may only be acquired, if at all, after a relatively long time. Accordingly, an ODP engine may operate in such a way as to maintain such an uncertainty at a relatively low value. For example, the ODP engine may decide to obtain a new position fix from an available SPS signal in response to the uncertainty of the stored position fix information increasing beyond a particular value. On the other hand, the ODP engine may decide not to obtain a new position fix from an SPS signal if the uncertainty continues to stay at a relatively low value, thus saving MS battery power among other things, as explained below.

FIG. 1 is a flow diagram of a process 100 for obtaining a position fix at an MS, according to an implementation. At block 110, an ODP engine, which may be located in an MS, may obtain position fix information from an SPS signal. Such position fix information may include time and/or location information with respect to an SPS navigation system, such as pseudoranges to transmitters and/or a geophysical location, for example. After acquiring position fix information, the MS may store such information in a memory. At block 120, stored position fix information may be updated periodically and/or from time to time. Such updating may comprise adding, and/or replacing at least portions of stored position fix information with, newer position information associated with non-SPS sources, such as Wi-Fi, Bluetooth, RFID, UMTS, WiMAX, broadcast TV, broadcast FM, and/or CDMA, just to name a few examples. Enabled by an ODP engine, an MS may measure and/or calculate signal metrics from signals that it receives from non-SPS sources. For example, signal strength, round trip delay, time of arrival, time difference of arrival, and/or angle of arrival of non-SPS signals received at the MS may lead to one or more signal metrics that may be used to update stored position fix information. In one implementation, an ODP engine may determine which particular signal metric, among a plurality of signal metrics, to use for such updating. For example, the ODP engine may utilize one or more localization algorithms associated with one or more signal metrics. The ODP engine may rank such algorithms based, at least in part, on a quality of their associated signal metric, coverage, TTF (time-to-fix), power consumption, and/or a cost function as described below. Additionally, a quality of service (QoS) may be considered in such a ranking. Accordingly, an ODP engine may select one or more of a plurality of localization algorithms based at least in part on such a ranking, which may change from time to time, to update stored position fix information. Of course, details associated with such algorithms are merely examples, and claimed subject matter is not so limited.

In an implementation, algorithms used by an ODP engine may include trade-offs with respect to one or more other algorithms. For example, non-SPS algorithms may be faster and more power-efficient compared to algorithms that correspond with SPS positioning technology. However, non-SPS algorithms may rely on an initial SPS location estimation, for example, depending on at least a portion of an SPS-based algorithm in some cases. On the other hand, such non-SPS algorithms may be used as a back-up positioning solution to enable an MS to determine its position in places where SPS coverage is not available. Otherwise, for example, GNSS may provide relatively accurate positioning information in open, outdoor areas but may consume relatively large amounts of power, have a relatively high TTF, and/or lack coverage in enclosed areas. To compare, for example, UMTS technology may provide less-accurate cell-ID and/or mixed cell sector-based location fixes, and may involve a traffic call and protocol exchange with a network location server. Despite such possible drawbacks, UMTS may be available to an MS while GNSS is not, for example. For another comparison with GNSS, Wi-Fi technology may provide accurate location fixes and have a lower TTF, but may cover a relatively small area. Despite such a drawback, however, Wi-Fi may be useful while GNSS is not available to an MS. Accordingly, in a particular implementation, an ODP engine may be configured to use non-SPS positioning technologies if they are available, while reducing high-cost SPS technology usage. For example, returning to FIG. 1, at blocks 110 and 120, SPS technology may be used to obtain a position fix from time to time, while such position fixes may be updated during intermediate times using non-SPS technologies, as described above. Of course, such descriptions of positioning algorithms are merely examples, and claimed subject matter is not so limited.

In an implementation, algorithms used by an ODP engine may run one or more SPS and/or non-SPS positioning technologies in a background fashion. In this context, "background positioning" may refer to a process that includes generating position information at a positioning engine for internal use by the ODP engine, whereas "foreground positioning" may refer to a request for position information from "outside" the ODP engine. For example, a foreground positioning application may involve a network server pinging an MS for its position, an enterprise application monitoring positions of an MS over time, and/or an application running on an MS displaying position information on the screen. Many other examples of foreground positioning applications exist. Background positioning algorithms that keep position and time uncertainties properly contained, may improve availability of a position fix, improve accuracy of a position fix, and/or improve the TTF required to compute a position fix if a foreground application requires a position fix, just to name a few advantages. Such background position information may include one or more metrics that may be stored by the ODP engine. Such metrics, which may comprise a position uncertainty metric that includes HEPE, a time uncertainty metric, and/or a quality of signal metric for example, may then be compared with one or more uncertainty thresholds, which may comprise data values that represent threshold values of such metrics. For example, a metric may comprise a HEPE position uncertainty and an associated uncertainty threshold may be 100 meters. The ODP engine may then select one or more SPS and/or non-SPS positioning technologies to update the background position information. Such a selection may be based, at least in part, on an operative condition as well as on a result of comparing metrics with their associated uncertainty thresholds. For example, if a metric comprising a time uncertainty exceeds its associated uncertainty threshold while a metric comprising a position uncertainty is well below its associated uncertainty threshold, then a positioning technology that estimates time relatively accurately (such as GNSS) may be selected. An operative condition may comprise an algorithm adapted to adjusting and/or modifying a process of the one or more selected SPS and/or non-SPS positioning technologies, for example. Such an algorithm may operate based, at least in part, on power consumption of the one or more SPS and/or non-SPS positioning technologies, time elapsed since a previous update of background position information, which metrics exceed their associated uncertainty threshold, and/or a degree to which metrics exceed their associated uncertainty threshold, just to name a few examples.

In a particular implementation, an ODP engine may use aging algorithms, including position uncertainty aging algorithms and time uncertainty aging algorithms. For example, position uncertainty aging algorithms may use an assumed maximum velocity and/or known/estimated/measured velocity data to determine rates at which position uncertainties associated with an MS evolve. In a similar example, time aging algorithms may use a system clock quality/stability that is measured/estimated based at least in part on system performance history to determine rates at which time uncertainties associated with an MS evolve.

Returning again to FIG. 1, at block 130, an ODP engine on-board the MS may determine, based at least in part on one or more signal metrics such as a change in a signal metric, an uncertainty of stored position fix information. As explained above, such an uncertainty may be affected by age of the latest position fix information, motion of the MS, and/or the RF environment in which the MS operates, just to name a few examples. Position uncertainty may be measured in terms of HEPE, as mentioned above. Time uncertainty may be measured in terms of any time units, e.g., seconds. In other words, uncertainty of position fix information, which may have been acquired from the last SPS fix, may generally increase as time elapses, the MS changes its location, and/or the RF environment becomes less favorable for receiving SPS signals. As discussed above, as the uncertainty increases, so too may a time needed to obtain subsequent position fix information from SPS signals. Such an uncertainty may be used to determine whether a subsequent SPS-based position fix is needed to lower the uncertainty, though with a concomitant trade-off of relatively costly power consumption. If not, then the ODP engine may continue to determine position fixes utilizing non-SPS positioning technologies, as explained above. For example, if the determined uncertainty increases beyond a tolerable threshold level, then the ODP engine may determine that it is time to obtain an SPS-based position fix, e.g., use an SPS signal to obtain a new position fix. In one particular implementation, for example, an ODP engine may compare the determined uncertainty with such a tolerable threshold level, herein referred to as an uncertainty-tolerance value. As at block 140, such a comparison may determine how process 100 proceeds: if the uncertainty is below such a value, then process 100 returns to blocks 120 and 130 where stored position fix information may be updated using non-SPS position fixes, as described above. On the other hand, if the uncertainty is at or above such a value, then process 100 proceeds to block 150 where a subsequent position fix from an SPS signal may be obtained. Another example may be: if the uncertainty is at or below such a value, then process 100 returns to blocks 120 and 130 where stored position fix information may be updated using non-SPS position fixes, but if the uncertainty is above such a value, then process 100 proceeds to block 150 where a subsequent position fix from an SPS signal may be obtained. Stored updated position fix information at block 120 may be used to acquire a subsequent position fix with an improved efficiency. For example, such stored position fix information may be used in conjunction with SPS signals to reduce a navigation acquisition window, leading to improved efficiency of location fixes. In one particular implementation, such a navigation acquisition window may comprise a GPS acquisition window such as a two-dimensional search "space," whose dimensions are code-phase delay and observed Doppler frequency shift, for example. After block 150, process 100 may return to block 120 where stored position fix information may again be updated, as described above. Of course, the behavior of such a process with respect to uncertainty of position information is merely an example, and claimed subject matter is not so limited.

Figure 2:
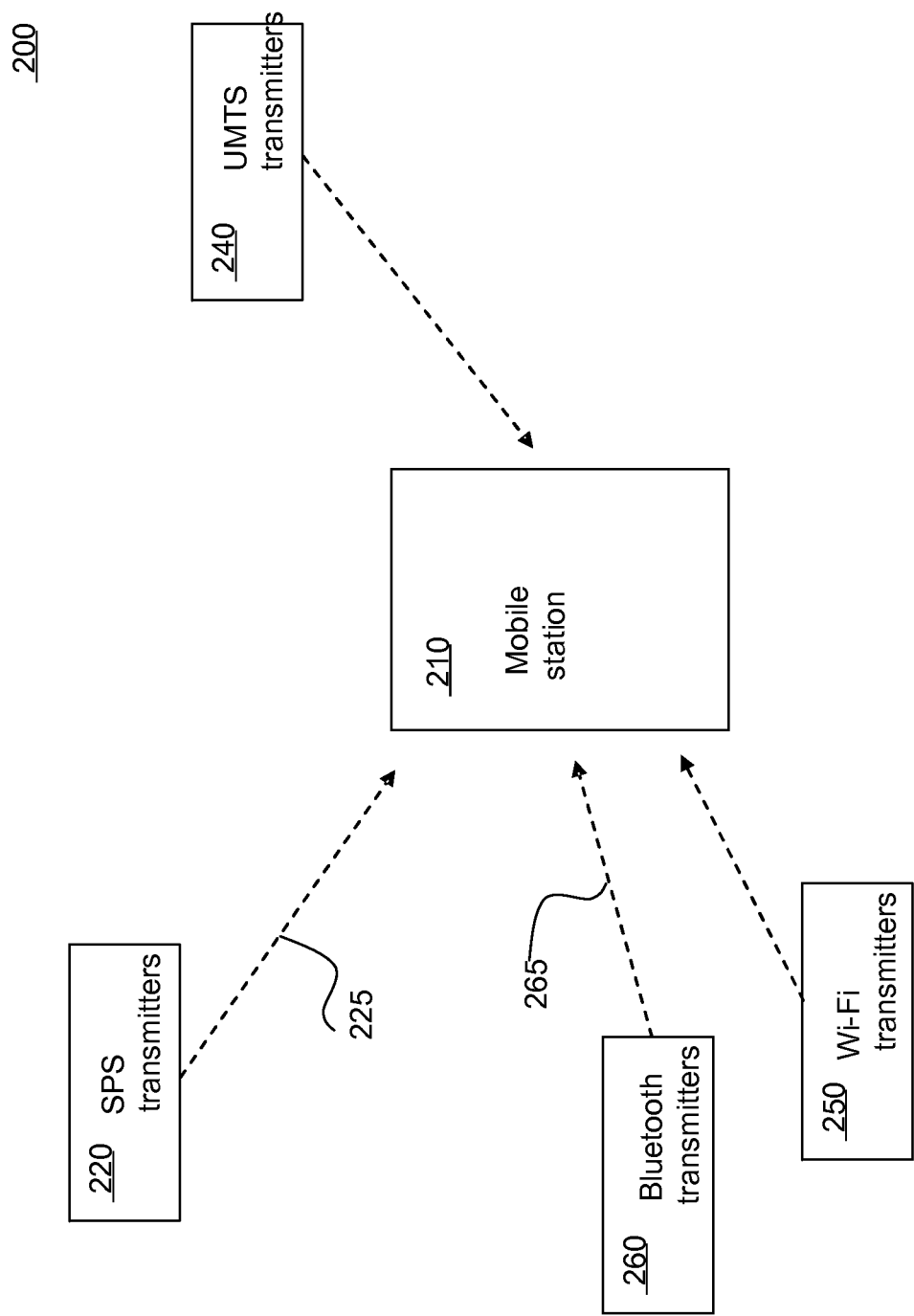
FIG. 2 is a schematic diagram showing several position-determining technologies available to a mobile device, according to an implementation.

FIG. 2 is a schematic diagram showing several position-determining technologies that may be available to a mobile device in a region 200, according to an implementation. MS 210 may be located in such an area to enable the MS to receive signals from one or more SPS transmitters 220, UMTS transmitters 240, Wi-Fi transmitters 250, and/or Bluetooth transmitters 260, just to name a few examples. Of course, signals from systems of other technologies may be received by an MS, and claimed subject matter is not so limited. SPS transmitters 220 may transmit signals 225 that may provide large, if not global, positioning coverage. Such signals, however, may be blocked if a line of sight between the MS and one or more SPS transmitters is blocked, such as may occur in a building, urban canyon, and/or enclosed environment, for example. In the case of such conditions, MS 210 may continue to obtain position fixes from non-SPS sources, as explained above. For example, signal 265 transmitted from Bluetooth transmitter 260, though relatively short-ranged, may be available to MS 210 inside a building where SPS signals 225 are blocked. In an implementation, MS 210 may store the last-obtained position fix information provided by SPS transmitters 220 (such as when the MS was last outdoors, for example). Such stored information may be updated based at least in part on a signal metric associated with one or more non-SPS sources available to MS 210 inside the building. In a particular implementation, in response to position and time uncertainties increases with time, MS 210 may use a new signal metric observation to update the uncertainties. For example, if RSS values obtained at different times from the same base station are similar or slowly changing, then there is a relatively high likelihood that MS 210 has not moved substantially. Accordingly, MS 210 may update uncertainties by appropriately reducing the position uncertainty. Such signal metrics may be used by MS 210 to detect its movement, among other things. Continuing with the example, Bluetooth signals 265 may provide one or more such signal metrics, including received signal strength, for example. Signal metrics provided by Wi-Fi may also be utilized if available. If positions of such transmitters are known, then their associated RSS may provide MS 210 with one or more position fixes. Stored position fix information may then be updated from time to time using such non-SPS sources. If SPS signals 225 become available to MS 210 (such as when the MS leaves a building, for example), then a new, subsequent position fix from SPS signals 225 may be obtained. However, even if the SPS signals are available, MS 210 may determine that it need not obtain a subsequent position fix from SPS signals if the position uncertainty of the MS is acceptably small, as explained above.

Figure 3:
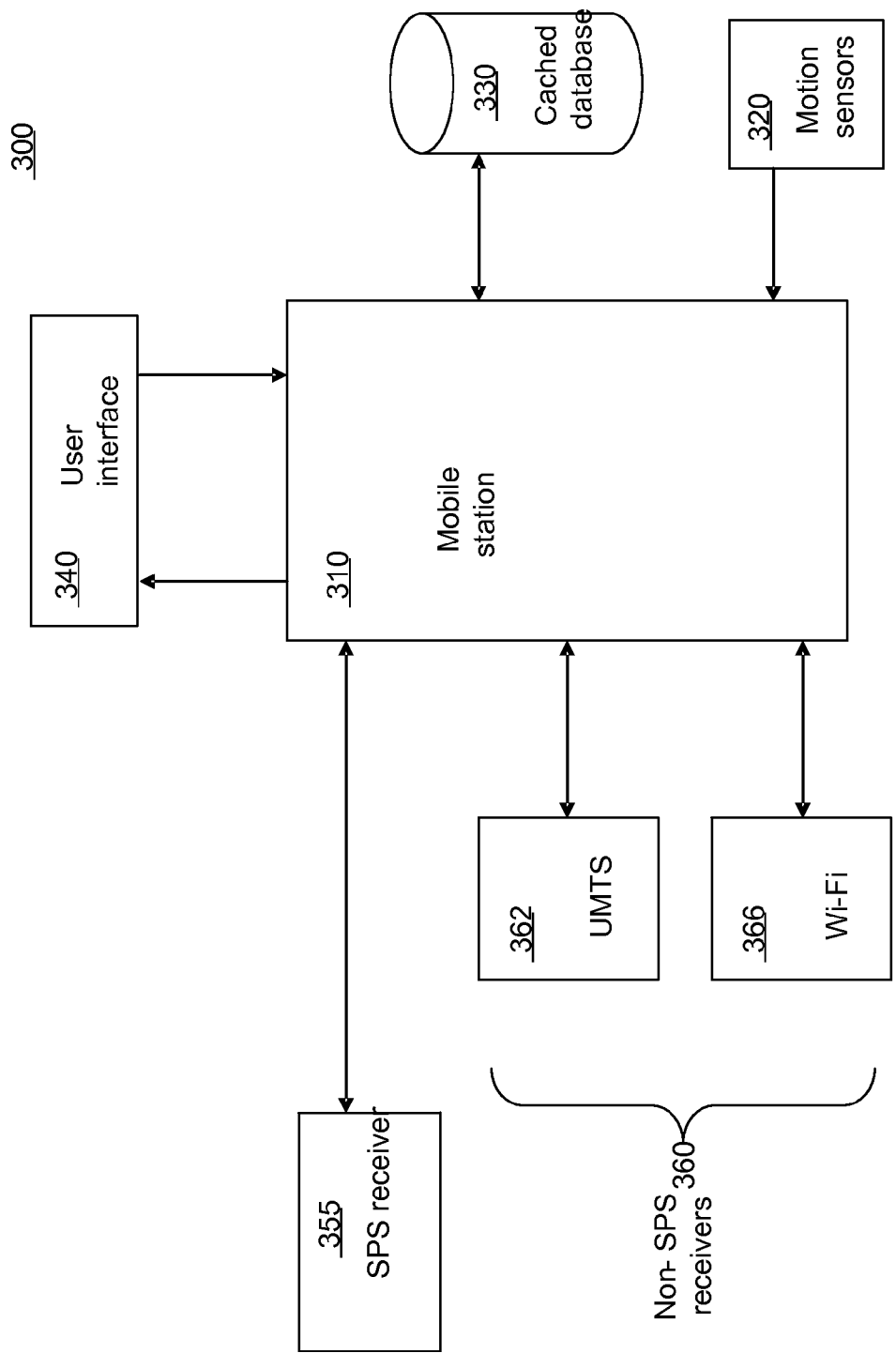
FIG. 3 is a schematic diagram showing a positioning system, according to an implementation.

FIG. 3 is a schematic diagram showing a positioning system 300, according to an implementation. Such a positioning system may be located in an MS, such as MS 210 shown in FIG. 2, for example. An ODP engine 310 may receive signals from motion sensors 320, SPS receiver 355, non-SPS receivers 360, which include UMTS 362 and Wi-Fi 366. Of course, such receivers are merely examples, and claimed subject matter is not so limited. ODP engine 310 may communicate with cached database 330 and user interface 340, which may also be located in MS 210.

Figure 4:
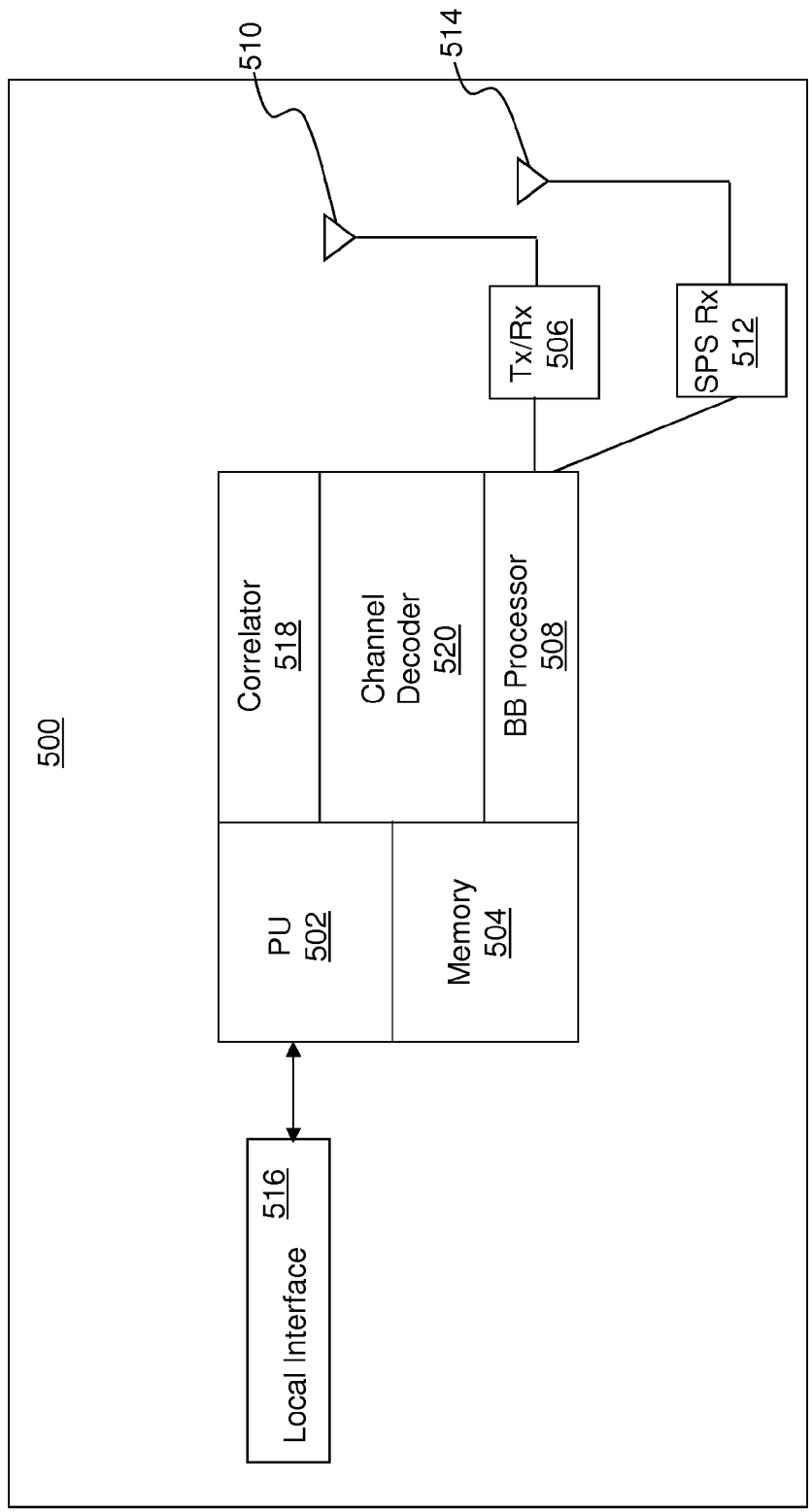
FIG. 4 is a schematic diagram of a device capable of communication with a wireless network and sensing its motion, according to one implementation.

FIG. 4 is a schematic diagram of a device 500 capable of communication with a wireless network (not shown) and sensing a motion of the device, according to one implementation. A mobile station, such as MS 210 shown in FIG. 2, may comprise device 500 that is capable of processing SPS signals received at an antenna 514 for determining pseudorange measurements and communicating with a wireless communication network through antenna 510. Here, transceiver 506 may be adapted to modulate an RF carrier signal with baseband information, such as data, voice and/or SMS messages, onto an RF carrier, and demodulate a modulated RF carrier to obtain such baseband information. Antenna 510 may be adapted to transmit a modulated RF carrier over a wireless communications link and receive a modulated RF carrier over a wireless communications link.

Baseband processor 508 may be adapted to provide baseband information from processing unit 502 to transceiver 506 for transmission over a wireless communications link. Here, processing unit 502 may include an ODP engine, such as ODP engine 310 shown in FIG. 3 for example. Such a positioning engine may obtain such baseband information from a local interface 516 which may include, for example, environmental sensory data, motion sensor data, altitude data, acceleration information (e.g., from an accelerometer), proximity to other networks (e.g., ZigBee, Bluetooth, Wi-Fi, peer-to-peer). Such baseband information may also include position information such as, for example, an estimate of a location of device 500 and/or information that may be used in computing same such as, for example, pseudorange measurements and/or position information received from user input. In a particular implementation, local interface 516 may include one or more transducers to measure a motion of device 500. Such transducers may include an accelerometer and/or a gyro, for example. Such a motion of device 500 may include a rotation and/or a translation. Measurements of one or more such motions may be stored in memory 504 so that stored measurements may be retrieved for use in determining a trajectory of device 500, for example. Processing unit 502 may be adapted to estimate a trajectory of device 500 based at least in part on measured motion data. Channel decoder 520 may be adapted to decode channel symbols received from baseband processor 508 into underlying source bits.

SPS receiver (SPS Rx) 512 may be adapted to receive and process transmissions from space vehicles, and provide processed information to correlator 518. Correlator 518 may be adapted to derive correlation functions from the information provided by receiver 512. Correlator 518 may be one multi-purpose entity or multiple single-purpose entities according to different technologies that are supported and detected. Correlator 518 may also be adapted to derive pilot-related correlation functions from information relating to pilot signals provided by transceiver 506. This information may be used by device 500 to acquire a wireless communications network.

Memory 504 may be adapted to store machine-readable instructions which are executable to perform one or more of processes, implementations, or examples thereof which have been described or suggested. Processing unit 502 may be adapted to access and execute such machine-readable instructions. However, these are merely examples of tasks that may be performed by a processing unit in a particular aspect and claimed subject matter in not limited in these respects.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes may be stored in a memory, for example the memory of a mobile station, and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Position determination and/or estimation techniques described herein may be used for various wireless communication networks such as a wireless wide area network (WWAN), a wireless local area network (WLAN), a wireless personal area network (WPAN), networks including femtocells, any combination of such networks, and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x network, for example.

Similarly, a receiver in an MS having a receiver and no transmitter may be adapted to obtain information enabling estimation of a location of the MS. Such an MS may comprise a device that is adapted to receive broadcast signals such as, for example, devices capable of acquiring broadcast signals transmitted in a format such as Digital TV, Digital Radio, DVB-H, DMB, ISDB-T and/or MediaFLO, just to name a few examples. As described above, such a MS may obtain such information from an acquisition process. However, the MS need not have sufficient processing resources (e.g., logic, memory, software, etc.) to process content in subsequently received broadcast signal carrying content (e.g., decode, decompress and/or render for presentation), for example. By not needing to process content in such a broadcast signal, such an MS may have reduced resources such as reduced memory resources, processing unit resources and/or decoder resources while still maintaining sufficient resources (e.g., hardware and software) to obtain a location estimate based upon stored acquisition information.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPSs.

Techniques described herein may be used with any one of several SPSs and/or combinations of SPSs. Furthermore, such techniques may be used with positioning determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with time. Such a transmitter may be assigned a unique PN code so as to permit identification by a remote receiver. Pseudolites may be useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

An entity such as a wireless terminal may communicate with a network to request data and other resources. A cellular telephone, a personal digital assistant (PDA), a wireless computer, or another type of MS, are just a few examples of such an entity. Communication of such an entity may include accessing network data, which may tax resources of a communication network, circuitry, or other system hardware. In wireless communication networks, data may be requested and exchanged among entities operating in the network. For example, an MS may request data from a wireless communication network to determine the position of the MS operating within the network: data received from the network may be beneficial or otherwise desired for such a position determination. However, these are merely examples of data exchange between an MS and a network in a particular aspect, and claimed subject matter in not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
    obtaining background position information for a mobile station based at least in part on one or more SPS and/or non-SPS positioning technologies, wherein said background position information includes one or more metrics;
    storing said one or more metrics;
    comparing said one or more stored metrics with one or more uncertainty thresholds; and
    selecting one or more of said one or more SPS and/or non-SPS positioning technologies to update said background position information, said selecting based, at least in part, on an operative condition and on said comparing.

2. The method of claim 1, wherein said background position information comprises position information generated at said mobile station.

3. The method of claim 1, wherein said one or more non-SPS positioning technologies comprise a motion-sensitive sensor.

4. The method of claim 1, wherein said one or more non-SPS positioning technologies comprise a wireless network interface including CDMA, UMTS, Wi-Fi, WiMAX, RFID, broadcast TV, broadcast FM, and/or Bluetooth.

5. The method of claim 1, wherein said one or more metrics comprise received signal strength (RSS), round trip delay (RTD), time of arrival (TOA), time difference of arrival (TDOA), angle of arrival (AOA), and/or Doppler frequency.

6. The method of claim 1, wherein said one or more metrics comprise a position uncertainty metric that includes a Horizontal Estimated Position Error (HEPE).

7. The method of claim 1, wherein said one or more metrics comprise a time uncertainty metric.

8. The method of claim 1, wherein said one or more metrics comprise a quality of signal metric.

9. The method of claim 1, wherein said operative condition comprises an algorithm to adjust a process of said selected one or more SPS and/or non-SPS positioning technologies.

10. The method of claim 9, wherein a process of said algorithm is based at least in part on power consumption of said one or more SPS and/or non-SPS positioning technologies, time elapsed since a previous update of background position information, which metrics exceed their associated uncertainty threshold, and/or a degree to which metrics exceed their associated uncertainty threshold.

11. An apparatus comprising:
    means for obtaining background position information for a mobile station based at least in part on one or more SPS and/or non-SPS positioning technologies, wherein said background position information includes one or more metrics;
    means for storing said one or more metrics;
    means for comparing said one or more stored metrics with one or more uncertainty thresholds; and
    means for selecting one or more of said one or more SPS and/or non-SPS positioning technologies to update said background position information, said selecting based, at least in part, on an operative condition and on said comparing.

12. The apparatus of claim 11, wherein said background position information comprises position information generated at said mobile station.

13. The apparatus of claim 11, wherein said one or more non-SPS positioning technologies comprise a motion-sensitive sensor.

14. The apparatus of claim 11, wherein said one or more non-SPS positioning technologies comprise a wireless network interface including CDMA, UMTS, Wi-Fi, WiMAX, RFID, broadcast TV, broadcast FM, and/or Bluetooth.

15. The apparatus of claim 11, wherein said one or more metrics comprise received signal strength (RSS), round trip delay (RTD), time of arrival (TOA), time difference of arrival (TDOA), angle of arrival (AOA), and/or Doppler frequency.

16. The apparatus of claim 11, wherein said one or more metrics comprise a position uncertainty metric that includes a Horizontal Estimated Position Error (HEPE).

17. The apparatus of claim 11, wherein said one or more metrics comprise a time uncertainty metric.

18. The apparatus of claim 11, wherein said one or more metrics comprise a quality of signal metric.

19. The apparatus of claim 11, wherein said operative condition comprises an algorithm to adjust a process of said selected one or more SPS and/or non-SPS positioning technologies.

20. The apparatus of claim 19, wherein a process of said algorithm is based at least in part on power consumption of said one or more SPS and/or non-SPS positioning technologies, time elapsed since a previous update of background position information, which metrics exceed their associated uncertainty threshold, and/or a degree to which metrics exceed their associated uncertainty threshold.

21. An article comprising: a non-transitory storage medium comprising machine-readable instructions stored thereon which, if executed by a processing unit, perform positioning, the instructions comprising:

code to obtain background position information for a mobile station based at least in part on one or more SPS and/or non-SPS positioning technologies, wherein said background position information includes one or more metrics;

code to store said one or more metrics;

code to compare said one or more stored metrics with one or more uncertainty thresholds; and code to select one or more of said one or more SPS and/or non-SPS positioning technologies to update said background position information, said selecting based, at least in part, on an operative condition and on said comparing.

22. The article of claim 21, wherein said background position information comprises position information generated at said mobile station.

23. The article of claim 21, wherein said one or more non-SPS positioning technologies comprise a motion-sensitive sensor.

24. The article of claim 21, wherein said one or more non-SPS positioning technologies comprise a wireless network interface including CDMA, UMTS, Wi-Fi, WiMAX, RFID, broadcast TV, broadcast FM, and/or Bluetooth.

25. The article of claim 21, wherein said one or more metrics comprise received signal strength (RSS), round trip delay (RTD), time of arrival (TOA), time difference of arrival (TDOA), angle of arrival (AOA), and/or Doppler frequency.

26. The article of claim 21, wherein said one or more metrics comprise a position uncertainty metric that includes a Horizontal Estimated Position Error (HEPE).

27. The article of claim 21, wherein said one or more metrics comprise a time uncertainty metric.

28. The article of claim 21, wherein said one or more metrics comprise a quality of signal metric.

29. The article of claim 21, wherein said operative condition comprises an algorithm to adjust a process of said selected one or more SPS and/or non-SPS positioning technologies.

30. The article of claim 29, wherein a process of said algorithm is based at least in part on power consumption of said one or more SPS and/or non-SPS positioning technologies, time elapsed since a previous update of background position information, which metrics exceed their associated uncertainty threshold, and/or a degree to which metrics exceed their associated uncertainty threshold.

31. An apparatus comprising:
a transceiver for obtaining background position information for a mobile station based at least in part on one or more SPS and/or non-SPS positioning technologies, wherein said background position information includes one or more metrics;

memory for storing said one or more metrics;

a processing unit for:
comparing said one or more stored metrics with one or more uncertainty thresholds; and for selecting one or more of said one or more SPS and/or non-SPS positioning technologies to update said background position information, said selecting based, at least in part, on an operative condition and on said comparing.

32. The apparatus of claim 31, wherein said background position information comprises position information generated at said mobile station.

33. The apparatus of claim 31, wherein said one or more non-SPS positioning technologies comprise a motion-sensitive sensor.

34. The apparatus of claim 31, wherein said one or more non-SPS positioning technologies comprise a wireless network interface including CDMA, UMTS, Wi-Fi, WiMAX, RFID, broadcast TV, broadcast FM, and/or Bluetooth.

35. The apparatus of claim 31, wherein said one or more metrics comprise received signal strength (RSS), round trip delay (RTD), time of arrival (TOA), time difference of arrival (TDOA), angle of arrival (AOA), and/or Doppler frequency.

36. The apparatus of claim 31, wherein said one or more metrics comprise a position uncertainty metric that includes a Horizontal Estimated Position Error (HEPE).

37. The apparatus of claim 31, wherein said one or more metrics comprise a time uncertainty metric.

38. The apparatus of claim 31, wherein said one or more metrics comprise a quality of signal metric.

39. The apparatus of claim 31, wherein said operative condition comprises an algorithm to adjust a process of said selected one or more SPS and/or non-SPS positioning technologies.

40. The apparatus of claim 39, wherein a process of said algorithm is based at least in part on power consumption of said one or more SPS and/or non-SPS positioning technologies, time elapsed since a previous update of background position information, which metrics exceed their associated uncertainty threshold, and/or a degree to which metrics exceed their associated uncertainty threshold.

* * * * *